US007048858B2

(12) United States Patent
Ihre

(10) Patent No.: US 7,048,858 B2
(45) Date of Patent: May 23, 2006

(54) POST-MODIFICATION OF A POROUS SUPPORT

(75) Inventor: Henrik Ihre, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 163 days.

(21) Appl. No.: 10/496,762

(22) PCT Filed: Nov. 26, 2002

(86) PCT No.: PCT/SE02/02173

§ 371 (c)(1),
(2), (4) Date: May 25, 2004

(87) PCT Pub. No.: WO03/046027

PCT Pub. Date: Jun. 5, 2003

(65) Prior Publication Data

US 2004/0262228 A1 Dec. 30, 2004

(30) Foreign Application Priority Data

Nov. 26, 2001 (SE) .................................... 0103968
Jun. 28, 2002 (SE) .................................... 0202075

(51) Int. Cl.
*B01D 15/08* (2006.01)

(52) U.S. Cl. .................. 210/656; 210/635; 210/198.2; 210/502.1; 502/404

(58) Field of Classification Search ................ 210/635, 210/656, 659, 198.2, 502.1; 525/61; 536/123.1, 536/126; 502/404
See application file for complete search history.

(56) References Cited

U.S. PATENT DOCUMENTS

| 4,094,832 A | | 6/1978 | Soderberg |
| 4,540,742 A | * | 9/1985 | Okamoto ..................... 525/61 |
| 5,453,186 A | * | 9/1995 | Muller et al. ............ 210/198.2 |
| 5,503,933 A | | 4/1996 | Afeyan et al. |
| 5,633,290 A | | 5/1997 | Frechet et al. |
| 5,865,994 A | | 2/1999 | Riviello et al. |
| 5,929,214 A | | 7/1999 | Peters et al. |

(Continued)

FOREIGN PATENT DOCUMENTS

WO    WO 95/13861    *  5/1995

OTHER PUBLICATIONS

Viklund, C., et al., "Preparation of Porous Poly(styrene-co-divinylbenzene) Monoliths with Controlled Pore Size Distributions Initiated by Stable Free Radicals and Their Pore Surface Functionalization by Grafting" Macromolecules, vol. 34, 2001, pp. 4361-4369.

*Primary Examiner*—Ernest G. Therkorn
(74) *Attorney, Agent, or Firm*—Yonggang Ji

(57) ABSTRACT

The present invention relates to a method for post-modification of a porous polymeric polysaccharide support comprising one or more unreacted double bonds, which method includes to contact the polymeric support with a liquid phase comprising at least one grafting compound and to initiate a free radical reaction in the mixture obtained, wherein the grafting compound is comprised of a double bond as a reactive group coupled to a linear or cyclic chain of carbon, which optionally comprises one or more heteroatoms. An advantageous grafting compound is a vinyl ether or a hydroxyvinyl ether. The invention also encompasses a polymeric support that has been post-modified by the method according to the invention as well as the use of such a support, e.g. in chromatography.

13 Claims, 4 Drawing Sheets

U.S. PATENT DOCUMENTS

| | | |
|---|---|---|
| 6,022,902 A | 2/2000 | Koontz |
| 6,153,707 A | 11/2000 | Davankov et al. |
| 6,803,171 B1 * | 10/2004 | Gronbeck et al. ........ 430/270.1 |
| 2005/0065282 A1 * | 3/2005 | Ihre et al. .................. 525/54.1 |

* cited by examiner

POST-MODIFICATION OF A POROUS SUPPORT

This application is a filing under 35 U.S.C. Å 371 and claims priority to international patent application number PCT/SE02/02173 filed Nov. 26, 2002, published on Jun. 5, 2003 as WO 03/046027 and also claims priority to Swedish patent application number 0103968-4 filed Nov. 26, 2001 and to Swedish patent application number 0202075-8 filed Jun. 28, 2002; the disclosures of which are incorporated herein by reference in their entireties.

TECHNICAL FIELD

The present invention relates to the field of porous polymeric supports, especially for use in chromatography. More specifically, the invention relates to a novel method of post-modification of such a support, resulting in a support with much improved properties when used in separation applications, such as chromatography.

BACKGROUND

Many methods for preparing porous polymeric supports useful in various separation applications are known today, such as suspension polymerisation of synthetic or native monomers. In order to improve the properties of so prepared supports, various strategies have also been suggested for modification of their surfaces. Such surface-modifications may for example be performed in order to enhance the available surface area of a support, to facilitate subsequent derivatisation with ligands for chromatography, to modify the hydrophobic/hydrophilic surface thereof etc.

One such surface modification is suggested in WO 95/13861 (Ericsson et al), wherein hydrophilic poly(vinyl ethers) are polymerised by cationic polymerisation to subsequently be coupled to the surface of a porous polymeric support, such as agarose. The method disclosed necessarily involves a step of protecting the hydroxyl group of the vinyl ether monomer before the polymerisation and a corresponding step for deprotection thereof in the polymer obtained. Thus, a drawback of the method described is the number of process steps required to obtain a surface-modified product.

It is known from EP 0 337 144 (Merck Patent Gesellschaft mit beschränkter Haftung) to graft chromatogrphic supports in order to develop separation materials, which are universally employable in chromatography. The grafting is effected in the course of customary redox polymerisation. Cerium(IV) ions are employed as polymerisation catalyst in order to form radical sites on the pore surfaces of support particles. Thus, one object of EP 0 337 144 is to improve the dissolving ability as compared to the known materials, which is provided by use of hydrophilic separation based on supports containing hydroxyl groups, the supports of which are coated with covalently bonded polymers. More specifically, the polymers are bonded to the support via radicals generated at the α-C atoms of the hydroxyl groups, and this kind of grafting therefore represent the principle "grafting from", see e.g. P F Rempp, P J Lutz: Comprehensive Polymer Science vol. 6, pp 403–421, Eds. G Allen et al, Oxford 1989. This technique is based on the initiation of polymerisation by a limited number of radicals on the support surfaces and is accordingly sensitive to termination by eg oxygen. The preferred monomers are monomers with a high rate of propagation, which typically means acrylamide, acrylate or methacrylate monomers, which also are those mentioned in the application.

U.S. Pat. No. 5,929,214 (Peters et al) discloses porous synthetic polymer monoliths wherein the pores contain grafted temperature-responsive polymers and copolymers. These monoliths are especially suitable for use as thermal gates or thermal valves. The pores in such monoliths are greater than about 600 nm in diameter, and therefore the polymers need to be of a sufficient size to occlude such macropores. Suitable monomers to form the thermally responsive polymers grafted onto the support of the pores are known and include acrylamides and methacrylamides substituted on the nitrogen atom with slightly hydrophobic groups, vinylcaprolactam, methyl vinyl ether, 3-hydroxypropylacrylate, vinyl acetate, 2-($C_2$–$C_6$)-alkyl-1-vinyloxazolines, ethylene oxide, propylene oxide, as well as copolymers thereof with copolymerisable comonomers which do not preclude thermal responsiveness of the resulting polymer. Suitable comonomers, e.g. methylenebisacrylamide with N-alkylacrylamide, may be used to provide cross-linking and controllable swelling or other desirable properties. The polymers produced according to U.S. Pat. No. 5,929,214 undergo a rapid and reversible phase transition from a first structure, below their lower critical solution temperature (LCST), to a second structure, above their LCST, and are therefore referred to as "thermo-shrinking" polymers.

Dhal et al (Dhal, Pradeep K.; Vidyasankar, S.; Arnold, Frances H. Division of Chemistry and Chemical Engineering, California Institute of Technology, Pasadena, Calif., USA. Chem. Mater. (1995), 7(1), 154–62) have disclosed surface grafting of functional polymers to macroporous poly(trimethylolpropane trimethacrylate). The type of functional monomer is selected in order to retain the physical properties of the original matrix.

U.S. Pat. No. 5,865,994 (Dionex Corporation) discloses a bifunctional cation-exchange composition comprised of crown ether functional groups, which allow formation of a complex with a cation, and non-crown ether cation-exchange functional groups, which are capable of charge-interaction with cations. Preferred non-crown ether functional groups are sulphonate, carboxylate and phosphonate groups. In U.S. Pat. No. 5,865,994, a comparative example of a standard cation-exchange resin is provided, wherein maleic anhydride and ethyl vinyl ether are grafted onto a macroporous polymeric resin. In the field of chromatography, the term "macroporous" is used for particles that are porous both in a dry or wet state, as compared to gelporous particles that are porous only in the wet state. Examples of the first group are e.g. the synthetic polymers, such as divinylbenzene and styrene, while the latter can be exemplified by various polysaccharides, such as agarose. In this context, it is well known that vinyl ethers in general are very difficult to polymerise as the sole monomer. See e.g. "Principles of Polymerization", Third Edition, page 200, Author: George Odian, and publisher: John Wiley & Sons, Inc., wherein in Table 3-1, the family of vinyl ethers are rated as a – (minus) for radical polymerisation. However, in the comparative example discussed above and presented in U.S. Pat. No. 5,865,994, the polymerisation is possible since the maleic acid anhydride will act as an electron acceptor while the ethyl vinyl ether will act as the electron donor.

Finally, it is known from U.S. Pat. No. 5,503,933 to form a hydrophilic-coated support, which comprises a hydrophobic domain including an unsaturated group and a hydrophilic domain. Hydrophilic coatings can e.g. be covalently attached to hydrophobic polymers, such as divinylbenzene cross-linked polystyrene. The purpose of the coatings described is to mask the hydrophobic supports and to provide a polymer, which is chemically stable at high and low extremes in pH.

SUMMARY OF THE INVENTION

One object of the invention is to provide a process of post-modification of a polymeric porous polysaccharide support, which is simplified in terms of time requirement and complexity as compared to the previously used methods. This is achieved by grafting relatively short polymer chains via unreacted double bonds present on the support, as described in claim 1 and the dependent claims. Thus, the grafting compound can e.g. be a vinyl ether, which is polymerised in situ by radical polymerisation on the surface of the support.

Another object of the present invention is to provide a process for post-modification of a polymeric porous polysaccharide support, the robustness of which is improved as compared to prior art methods.

Another object of the invention is to provide a method of post-modification of a cross-linked polysaccharide support as mentioned above, which results in a support that exhibits an improved mechanical stability and consequently improved flow properties when it is used in chromatography.

Yet another object of the invention is to provide a method of post-modification of a cross-linked polysaccharide support as mentioned above, which method provides an improved versatility as regards design of various different supports with specific properties. A specific object of the invention is to provide a method of post-modification of a cross-linked polysaccharide support as described above, which method enables to provide such various supports in fewer process steps than the prior art methods.

A further object of the invention is to provide a polymeric porous support useful as a chromatographic matrix, wherein steric hindrance effects are reduced. This is achieved by a post-modification of a polymeric porous support as above, wherein the grafting compound used provides chains of a suitable length to essentially block micropores, while leaving the larger pores open for diffusive transport.

Yet another object of the present invention is to provide a polymeric porous polysaccharide support useful as a chromatographic matrix, which exhibits an improved resolution as compared to prior art supports. Such a support is provided by use of the post-modification described above, which method can improve both the column efficiency and the selectivity.

Another object of the present invention is to provide a method of post-modification of a porous polymeric polysaccharide support, which method allows an enhanced flexibility as regards the degree of hydrophobicity and hydrophilicity obtained in said support. For example, by using a hydrophilic monomer as the grafting compound, such as a hydrophilic vinyl ether, the support is rendered hydrophilic. Such a hydrophilic support can in turn be used in the manufacture of an ion exchanger, affinity chromatography resin etc, which will be essentially free from undesired, non-specific hydrophobic interactions.

Alternatively if e.g. a hydrophobic vinyl ether, or a styrene or styrene derivative, is used as one grafting compound, a support which is essentially hydrophobic in nature will be obtained. Thus, by suitably selecting the grafting compound used in the novel method of post-modification, the degree of hydrophobicity of the so modified support is easily controlled. Consequently, the preparation of supports that are advantageously used in hydrophobic interaction chromatography (HIC) are enabled by the present invention.

Other objects and advantages of the present invention will appear from the detailed discosure that follows as well as from the appended claims.

DEFINITIONS

Figure 1:
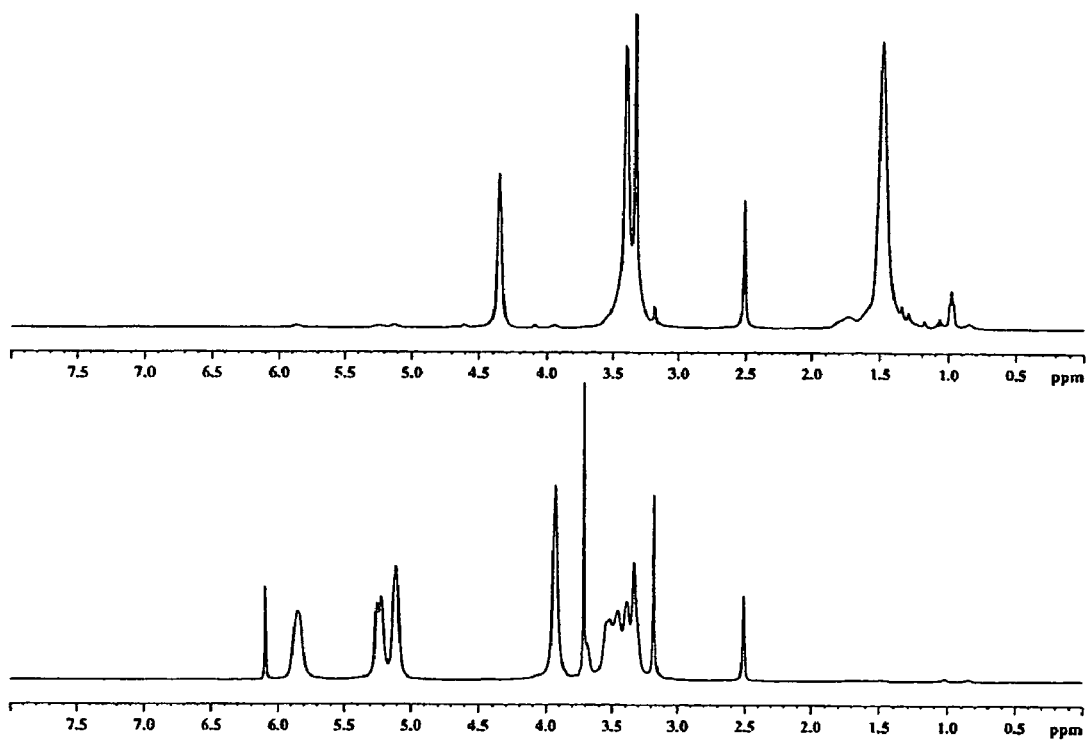
FIG. 1 is an $^1$H NMR spectra of a porous agarose support (Sepharose™ 6 Fast Flow) with allyl groups (bottom) and the same kind of support post-modified with poly-hydroxybutyl vinyl ether according to the invention (top).

In the present specification, terms that are not specifically explained are used in the conventional meaning that a person skilled in the art would understand from reading in the present context.

The term "macroporous" particles means particles that are porous both in a dry or wet state, as compared to "gelporous" particles that are porous only in the wet state.

The term "grafting" is used herein for a second polymerisation, wherein groups such as double bonds that have remained unreacted after a first polymerisation are now reacted. (For a review of different principles of grafting, see e.g. P F Rempp, P J Lutz: Comprehensive Polymer Science vol. 6, pp 403–421, Eds. G Allen et al, Oxford 1989.)

DETAILED DESCRIPTION OF THE PRESENT INVENTION

More specifically, the present invention is a method for post-modification of a porous polymeric support comprising one or more unreacted double bonds, which method includes the steps of (a) contacting the polymeric polysaccharide support with a liquid phase comprising at least one grafting compound;
(b) initiating a free radical reaction in the mixture obtained from step (a) between one or more double bonds on said polymeric support and one or more reactive groups on the grafting compound, and optionally
(c) washing the polymeric support to remove any excess of grafting compound;

wherein the grafting compound is comprised of a double bond as a reactive group coupled to a linear or cyclic chain of carbon, which optionally comprises one or more heteroatoms. The unreacted double bonds can remain from the manufacture of the support and/or have been introduced deliberately. The unreacted double bonds, i.e. allyl groups, are also understood to be accessible for reaction, as described herein.

As mentioned above, the present method of post-modification is a flexible method including improved possibilities to introduce one or more functional groups for future use in ion exchange methods. The method of grafting according to the invention results in an advantageous polymerisation within pores as well as on the outer surface of the support, and improved results in chromatography has been shown, presumably due to an improved mass transport.

In the present context, it is understood that the term "polysaccharide" support is interpreted to include any polysaccharide-based support, such as e.g. an agarose or dextran support which has been cross-linked with a synthetic cross-linking agent. Thus, the polysaccharide support is comprised of a polysaccharide as will be exemplified below, but may in addition comprise added agents in minor amounts, which are not polysaccharides. The polysaccharide supports that are surface-modified according to the invention can easily be prepared according to standard methods, such as inverse suspension gelation (S Hjertén: Biochim Biophys Acta 79(2), 393–398 (1964). Alternatively, the base matrices are commercially available products, such as Sepharose™ FF (Amersham Biosciences AB, Uppsala, Sweden).

In one embodiment of the present method step (b) is performed by adding a free radical initiator in an amount sufficient to polymerise added grafting compound to the polymeric support. The free radical can be any suitable commercially available initiator, based e.g. on diacetyl peroxide, dibenzoyl peroxide, dilauroyl peroxide, t-butyl peroxypivalate, t-butyl peroctoate, t-amyl peroxypivalate, t-butyl peroxy-2-ethylhexanoate, di-(4-t-butylcyclohexyl) peroxydicarbonate, 2,2'-azobis(isobutyronitrile), 2,2'-azobis(2,4-dimethylvaleronitrile), or 1,1'-azo-bis (cyanocyclohexane), and mixtures thereof. Specific examples are the products V65 (=2,2'-azo-bis(2,4-dimethylvaleronitrile, Wako Pure Chemical Industries) or AIBN (=2,2'-azobis(isobutyronitrile), also from Wako Pure Chemical Industries). The choice of the free radical initiator is easily made by the skilled in this field considering the grafting compound used, which will be discussed in more detail below. The amount thereof is not critical and is easily selected by the skilled in this field, e.g. within the range of 1–10 mol % (per monomer). The basic consideration when deciding a suitable amount of free radical initiator would simply be that substantial excess thereof might have a negative impact on the polymerisation, while a too small amount may not be sufficient for the desired result.

The radical reaction between reactive groups on the grafting compound, the double bonds present on the support and the free radical initiator discussed above can be set off by any conventional method, such as heating, irradiation with UV light, addition of a chemical etc. Alternatively, the polymerisation can be initiated by gamma- or electron radiation, in which case no initiator needs to be present. If heating is used, a heat bath, an oven etc can be used. The exact temperature will depend e.g. on the nature of the grafting compound and the free radical initiator, but can for example be above about 50° C., such as about 70° C., and can continue during a suitable period of time, such as between 2–20 hours.

As mentioned above, one of the advantages of the present invention is the simplicity of the method. Thus, the polymerisation reaction described above is based on conventional chemistry, and the steps do not require any specific equipment etc and are easily adapted as suitable by the skilled in this field. Naturally, the same considerations can be applied here as for any conventional free radical polymerisation process, where the advantages e.g. of working without contact with oxygen etc can be utilised. However, such details are well known to the skilled in this field, and do not change the concept of the invention as defined by the claims.

In most cases, the post-modification according to the invention also includes a step for washing the grafted gel polymeric support as described in step (c). Such as washing can for example be performed using water, methanol, ethanol, acetone, or any other suitable buffer or solution, depending on the grafting compound and the polymeric support used. Such a removal of excess monomer, oligomers and polymers not covalently coupled to the gel is a conventional measure in this field and the skilled person can easily decide on the conditions thereof.

In order to decide the degree to which there still remain double bonds on the polymeric support after the post-modification according to the invention, the most convenient way is simply to use a gravimetric method. Put differently, the support is weighed before and after post-modification, and the weight increase will represent the grafted compound. More specifically, the amount of grafted polymer will be inversely proportional to the amount of originally present allyl groups. Alternatively, the result can be evaluated using IR, as conventionally used in this field. Thus, the skilled person can easily perform a control experiment in order to decide the quantitative or qualitative results of a post-modification according to the invention.

Materials that are especially advantageously used according to the invention are those wherein the support density of unsaturated groups is relatively high, since such materials will provide a large number of sites available for derivatisation useful in subsequent chromatographic applications.

In an advantageous embodiment of the present method, the porous polymeric support is a cross-linked polysaccharide that presents reactive double bonds available for polymerisation. In this context, the term "reactive" means that said groups are available for the post-modification according to the invention, and such double bonds can be provided by modification of the polysaccharide with virtually any group that can participate in a radical initiated polymerisation. Thus, in this embodiment, the support can comprise cross-linked carbohydrate material, such as agarose, agar, cellulose, dextran, chitosan, konjac, carrageenan, gellan, alginate etc. Agarose and dextran supports are commercially available, e.g. as Sepharose™ (Amersham Biosciences AB, Uppsala, Sweden). Alternatively, such supports are easily prepared by the skilled person in this field using well-known methods. As is well known, even though polysaccharides such as agarose will gel spontaneously, a chemical cross-linking agent, such as epichlorohydrin, is preferably added in order to provide a sufficiently rigid product for use as a chromatographic support. Modification of a polysaccharide support with double bonds, i.e. to provide such supports with unreacted double bonds as discussed above, is also easily performed according to well-known methods. Thus, in an illustrative embodiment, the present polysaccharide has been allylated by treatment with an allyl-functional epoxide at suitable temperatures and reaction times. One example of such a commonly used allyl-functional epoxide is allyl glycidyl ether (AGE), but as the skilled person in this field will realise practically any agent can be used. Similarly, the allylation can alternatively be performed by using other allyl-functional agents, such as allyl-functional epoxide analogues, or allyl halides such as allyl bromide, allyl chloride etc. However, any functional epoxide can be used to this end, such as a vinyl epoxide. Thus, the double bond can be attached to the polysaccharide support via any suitable compound that does not have any negative effect of the post-modification or the future use of the support in chromatography. For example, compounds that are analogue to the herein described grafting compounds can be used, with the corresponding variations in chain length, substituents etc. As is easily realised, in view of the formulas given herein, the support surface will then replace one of the molecule ends while the double bond is free to react in a post-modification.

The surface-modification according to the present invention differs from the preparation of commercially available dextran-coated chromatography beads, such as Sepharose™ XL media™ (Amersham Biosciences AB, Uppsala, Sweden), since such dextran-coatings have been coupled to the hydroxy groups of the agarose before allylation thereof in order to enhance the available surface area thereof Contrary, the present invention first allylates said hydroxy groups and after that performs an in situ radical polymerisation of a suitable grafting compound to the allyl groups obtained.

As will be shown in the Experimental part below, the embodiment of the invention wherein a cross-linked polysaccharide support is surface-modified results in a support with much improved mechanical properties. This is an important advantage of the present invention, since it has been a well recognised problem within this field that the high porosity of conventional agarose particles, which is often in the region of 94–96%, is accompanied by mechanical properties that are less advantageous. More specifically, the mechanical properties of conventional products will entail a risk of collapse of particles in processes wherein higher flow rates are used. Naturally, the higher the flow rate, the more economical the process usually is, and therefore highly porous agarose particles that can withstand increased flow rates in chromatographic procedures has long been a need that the present invention fulfils. Without limiting the present invention to any specific theory, it is speculated that the improved mechanical strength obtained in the surface-modified support is due to a further cross-linking of some allyl groups, by radical mechanism, which are present on the support surface but does not participate in the actual polymerisation of grafting compound.

In an advantageous embodiment, the grafting compound comprises a group which is a readily derivatised functionality, such as a hydroxyl group. The hydroxyl may be derivatised e.g. with glycidol. Plural molecules of glycidol may be polymerically attached to the hydroxyl by addition of boron trifluoride etherate to produce a covalent coating comprising polymer chains including plural hydroxyls. Alternatively, hydroxyls may be oxidised to produce plural carboxylic acid groups. In another embodiment, the hydroxyl may be reacted with a compound such as an epihalohydrin, such as epibromohydrin, to produce a terminal halide on the covalent coating, which may be reacted with an amine to produce a quaternary amine.

Normally, the grafting compound refers to a monomeric compound, and hence the monomers will be discussed below. During the grafting reaction, added monomer will react directly with the unreacted double bond present on the support. However, it is probable that at the same time some monomers first react with each other to form shorter polymer chains, which in turn are grafted to the support via said unreacted double bonds.

One advantageous aspect of the present method is a method of post-modification of a porous polymeric polysaccharide support as described above, wherein at least one grafting compound is represented by the general formula (I):

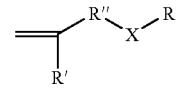

wherein
R=a $C_1$ to $C_{30}$ alkyl chain, optionally substituted with one or more hydroxyl, amine, carbonyl, ether, oxygen or any other suitable group that has no or a minimal negative impact on the properties of the final support;
R'=H or $CH_3$;
R"=a $C_0$ to $C_{30}$ alkyl chain or oxygen; and
X=$O_n$, wherein n=0–1, with the proviso that if R" is an oxygen, then n is 0, and if R" is an alkyl chain, then n is 1.

Thus, it has been found that the grafting compound advantageously comprises one double bond and one ether functionality, optionally separated from each other by one or more carbon atoms. Preferably, the grafting compound is vinyl ether wherein the carbon chain is comprised of at least 2 carbons, i.e. ethyl vinyl ether.

More specifically, in one embodiment, the grafting compound is described by formula (I), wherein R is a $C_{17}$ chain, R' is H, R" is O and X is $CH_2$. Thus, the grafting compound can be vinyl ether. There are about 150 different vinyl ethers commercially available at present. Vinyl ethers are known to polymerise readily under cationic conditions, but the present invention discloses for the first time a free radical polymerisation thereof for the purpose of grafting a polymeric support. In general, vinyl ethers in liquid form having a boiling point above about 100° C. are preferred, since they are conveniently handled. Thus, any vinyl ether, such as a ethyl vinyl ether, n-butyl vinyl ether, iso-butyl vinyl ether, tert-butyl vinyl ether, cyclohexyl vinyl ether, octadecyl vinyl ether, hydroxybutyl vinyl ether, ethylene glycol mono vinyl ether, cyclohexanedimethanol monovinyl ether etc, is conveniently used. The technical effect observed especially when vinyl ethers are used as grafting compounds is that they appear to provide a polymerisation which is sufficiently efficient to provide a large number of sites available for subsequent derivatisation in pores and on bead supports, while at the same time the polymerisation obtained is not efficient enough to occlude the pores. This result was unexpected, and contributes to the advantages obtained by the present invention.

In the case of a cross-linked polysaccharide support, it is especially advantageous to use a grafting compound that also includes functional ligands that can provide binding groups on the surface of the modified support. Thus, in this context, the term "functional ligand" is understood to include any group that can either change the surface properties of the surface-modified support or that can function as a binding group thereon. In a specific embodiment, said ligands are selected from the group that consists of ionic groups, affinity groups, hydrophobic groups, hydrophilic groups etc. In the most advantageous embodiment the polymeric support is comprised of cross-linked agarose. This is advantageous since agarose in itself will not provide any, or at least very few, interactions with a target substance when the support is used in chromatography. Thus, this embodiment of the present method will result in a surface-modified support, which is useful as a highly selective chromatographic support. Furthermore, by including functional groups, such as ionic groups, a support that has been surface-modified according to this embodiment of the invention is directly useful as a derivatised support. Hence, the number of steps required in a process of producing a support that carries the desired ligands and/or properties is reduced as compared to when a separate step is required for adding such ligands and/or properties. Consequently the costs thereof are also substantially reduced. In this context, it is understood that such functional groups can be present either on the grafting compound represented by formula (I), or, in the case of more than one kind of grafting compounds are used, on a different monomer. The amount of functional groups that are available on the modified support will be dependent on the ratio between the different grafting compounds.

An advantageous aspect of the present invention is a process of providing a separation medium with a predetermined hydrophobicity comprising a method of post-modification as defined above, wherein at least two grafting compounds of different hydrophobicity are used. Thus, the method can be used to design a support for use in a desired context, such as hydrophobic interaction chromatography. As is well known, the term hydrophobicity refers to materials with little or no tendency to absorb water, while the opposite is known as hydrophilicity, i.e. affinity for water. Accordingly, the present process is equally well defined as a process wherein to grafting compounds of different hydrophilicity are used. In this context, the term "predetermined" means that the proportion of the two or more grafting compounds used in the post-modification is assumed to result in at least roughly the same proportion in the final product. Accordingly, for a more hydrophobic support, a larger proportion of the more hydrophobic grafting compound is used in the post-modification. In order to routinely identify an advantageous composition of the mixture of grafting compounds, a series of various proportions can be tested, such as 95:5; 90:10; 80:20; 70:30; 60:40; 50:50; 40:60; 30:70; 20:80; 10:90 and 5:95 of a first and a second grafting compound, or any other suitable proportions such as if more than two grafting compounds are used. Accordingly, the composition is easily optimised by the skilled person in this field in order to select a desired proportion of grafting compounds of different hydrophobicity.

As the skilled in this field easily realises, basically any combination of grafting compounds can be used, as long as their properties differ to a sufficient extent to provide a product of desired properties.

In one embodiment, a first grafting compound is a hydroxy alkyl vinyl ether and a second grafting compound is a vinyl alkyl ether. However, it is understood that other kinds of vinyl ethers are equally useful, such as the ones comprising branched alkyl chains and/or ring structures.

In a specific embodiment, a first grafting compound is represented by formula (I) and a second grafting compound is a functional monomer of lower or higher hydrophobicity. Usually, the grafting compound represented by formula (I) is used as a reactive solvent, and hence in excess.

In another aspect of the present method of post-modification of a porous polymeric support, the grafting compound is described by the general formula (II)

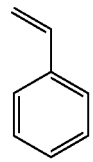

wherein the ring can carry any suitable substituent that has no or a minimal negative impact on the desired properties of the final product. Accordingly, this embodiment also encompasses derivatives of formula (II), i.e. styrene derivatives.

In one advantageous embodiment, the present method includes a further step (d) using the post-modified chromatographic support so prepared in chromatography, preferably in reversed phase chromatography (RPC).

RPC is a method, which is often used for separation and purification of e.g. peptides and smaller proteins. The present inventors have surprisingly found that a polymeric support post-modified by the method according to the invention if used in RPC can provide much improved results as regards effectivity and selectivity. In some cases, such as with insulin, conventional RPC using silica matrices have been found to give better results than divinyl-based matrices. However, use of silica in this context includes drawbacks due to its sensitivity to alkali. Silica-based materials are consequently unsuitable for use in methods wherein cleaning in place (CIP) is performed, since such cleaning normally uses sodium hydroxide. Accordingly, the lifetime of a silica-based matrix is too short to be economic. However, post-modification of a divinyl-based matrix have been shown by the present inventors to results in a material which gives better results as concerns e.g. resolution, as shown in the experimental part below. Accordingly, in an especially advantageous embodiment, the present method is used to purify insulin by RPC using a matrix, which has been post-modified as described above. Such a purification according to the invention can e.g. be the last step in a process where insulin has been produced recombinantly, and a coarse capture step has first been performed e.g. by ion exchange chromatography, which is followed by RPC as discussed above. Alternatively, the present support is used in a capture-step in the purification of insulin. Naturally, the present invention is also advantageous for other and similar proteins, e.g. for a last purification to a high degree of purity using RPC. Especially proteins which have a subsequent pharmaceutical use are especially advantageously purified this way, since it enables to reach as high levels of purity as required within that industry. Another advantageous example of where RPC using a post-modified porous polymeric support according to the invention can be utilised is for analytical purposes, i.e. on a smaller scale than the above-discussed preparative chromatography.

The present invention also encompasses a polymeric support that has been post-modified using the above-described method. Such a support can e.g. be particles, a monolith or a membrane and is useful in chromatographic or batchwise separations. One especially advantageous such support is a matrix for ion exchange chromatography (IEX) or for hydrophobic interaction chromatography (HIC). In the latter case, the matrix has preferably been prepared in accordance with the process described above for design of a desired hydrophobicity. The invention also encompasses the use of a post-modified porous polymeric support as defined above in chromatography.

Finally, the invention also encompasses a chromatographic column comprising a post-modified porous polymeric support as defined above. Such a column can be a packed column, and may be either in small scale or in large-scale for industrial use.

DETAILED DESCRIPTION OF THE DRAWINGS

FIG. 1 is an $^1$H NMR spectra of Sepharose™ 6 Fast flow with allyl groups (bottom) and Sepharose™ 6 Fast Flow post-modified with poly-hydroxybutyl vinyl ether (top). The results are explained in Example 1.

Figure 2:
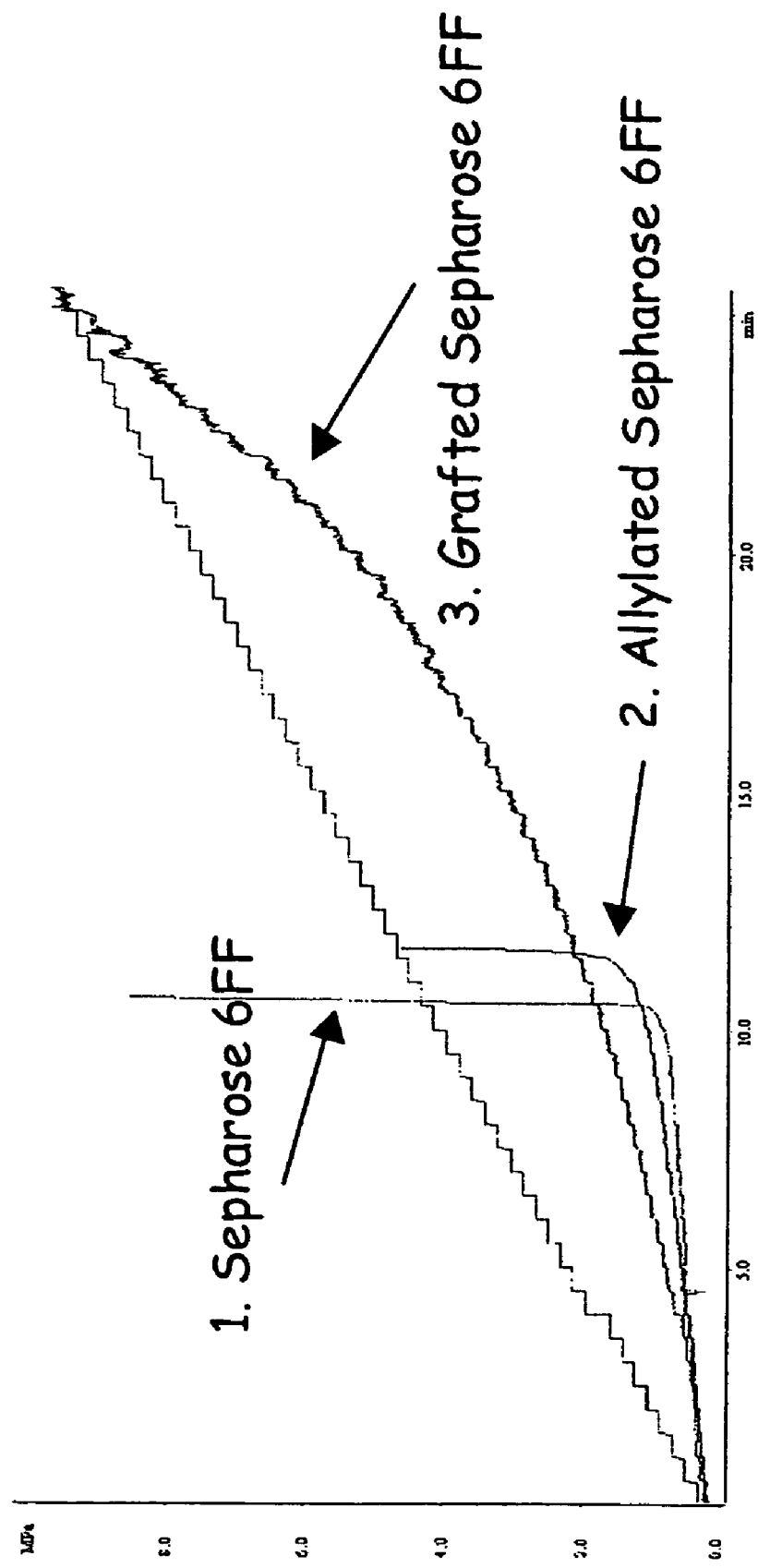
FIG. 2 is a pressure/flow (Y- and X-axis, respectively) curve showing the enhanced mechanical properties of Sepharose™ 6 Fast Flow post-modified with poly-hydroxybutyl vinyl ether according to the invention as compared to Sepharose™ 6 Fast Flow and the corresponding allylated Sepharose™ 6 Fast Flow.

FIG. 2 is a Pressure/Flow curve showing the enhanced mechanical properties of Sepharose™ 6 Fast Flow post-modified according to the invention with poly-hydroxybutyl vinyl ether as compared to Sepharose™ 6 Fast Flow and the corresponding allylated Sepharose™ 6 Fast Flow. It appears clearly how the pressure increases dramatically when the conventional support is used, while a much more attractive pressure curve results from use of the support that has been post-modified according to the invention.

Figure 3:
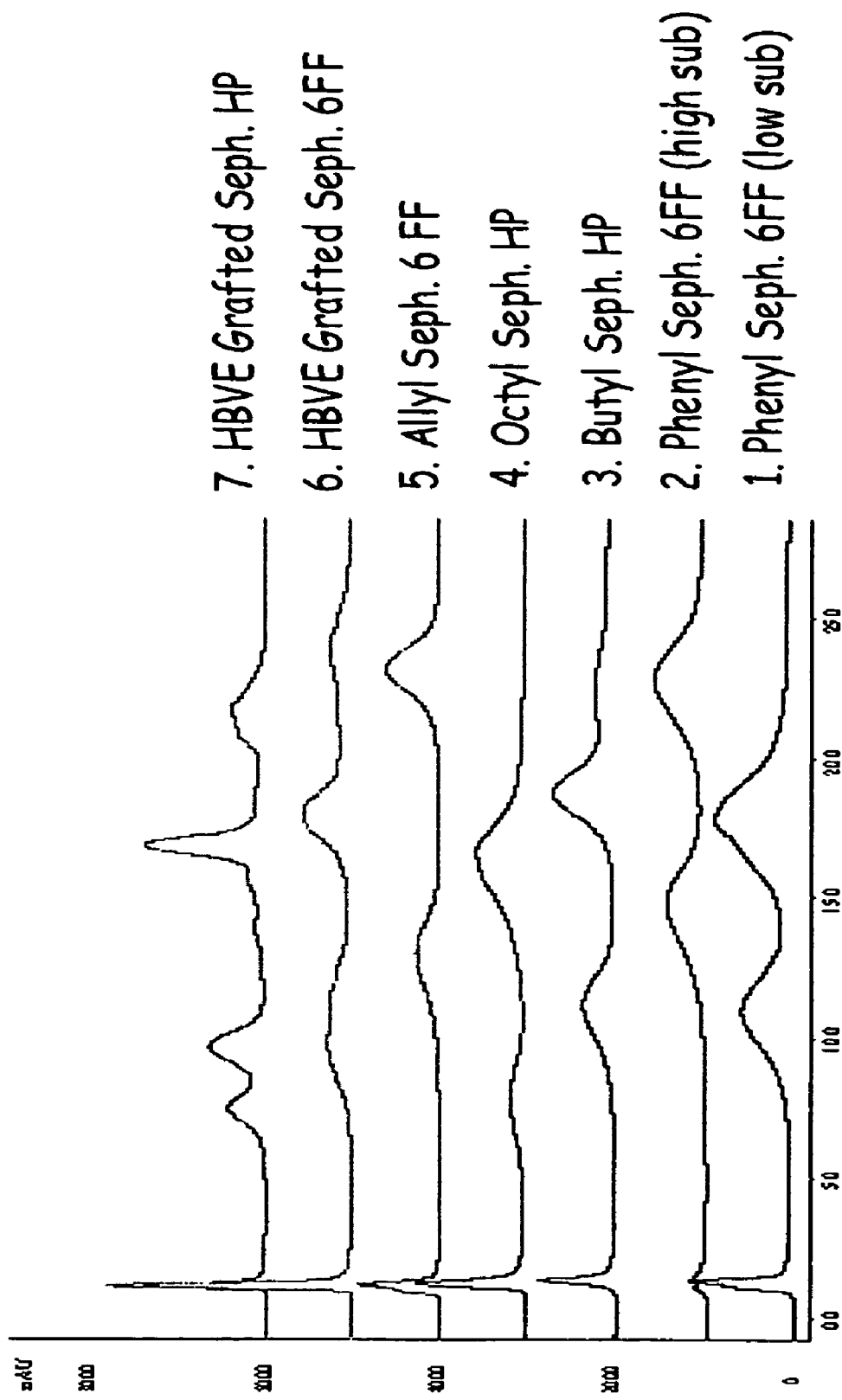
FIG. 3 is a chromatogram showing the separation of four proteins by Hydrophobic Interaction Chromatography (HIC). The improved resolution of Sepharose™ 6 High Pressure and 6 Fast Flow post-modified with poly-hydroxybutyl vinyl ether according to the invention is shown at the top.

FIG. 3 is a chromatogram showing the separation of four proteins (myoglobin, ribonuclease A, chymotrypsinogen A and alpha-lactalbumin) by Hydrophobic Interaction Chromatography (HIC). The improved resolution of Sepharose™ 6 High Pressure and 6 Fast Flow grafted with poly-hydroxybutyl vinyl ether is shown at the top.

Figure 4:
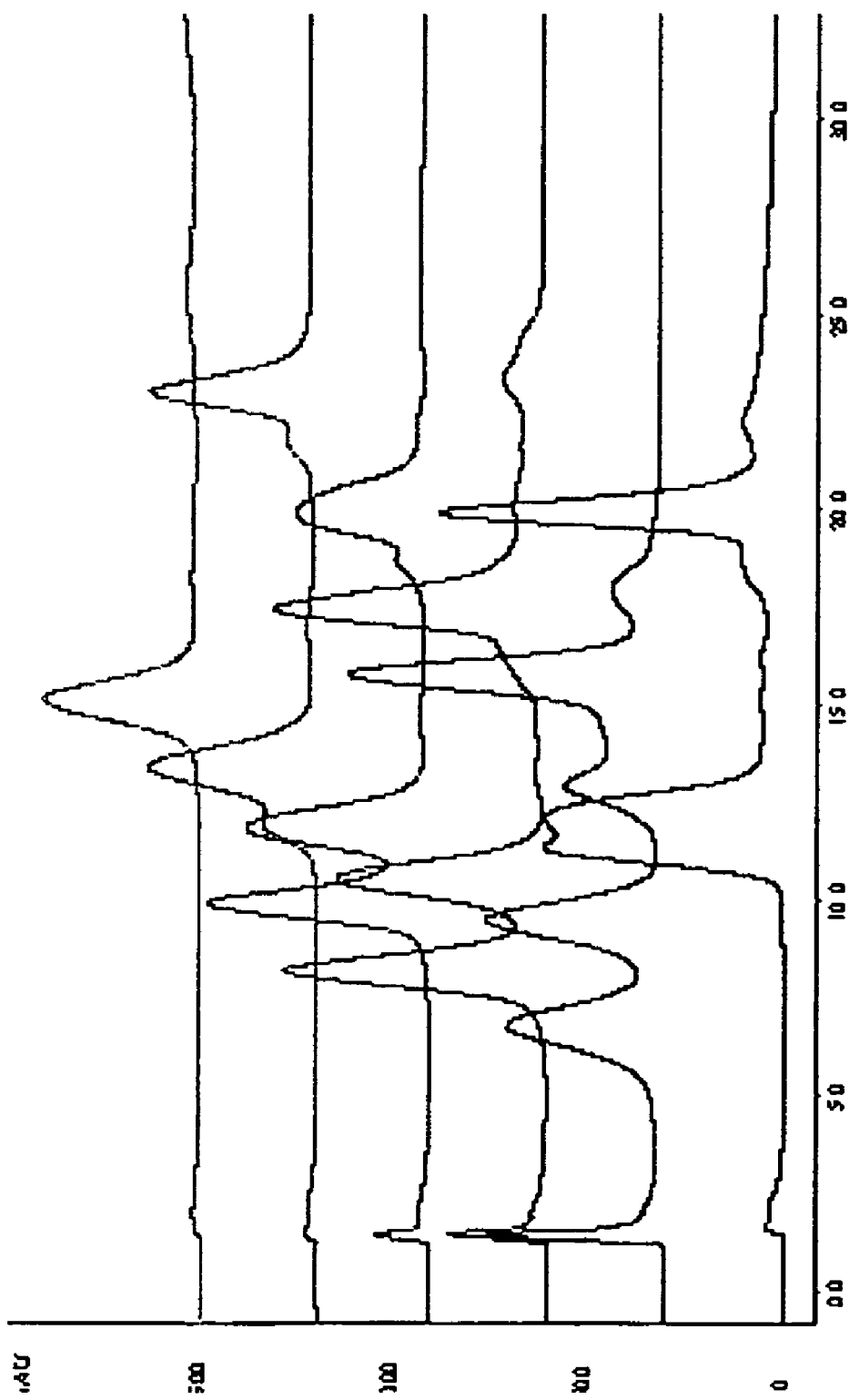
FIG. 4 is a chromatogram that shows the separation of three proteins with hydrophobic interaction chromatography (HIC) on various matrices. The bottom chromatogram has been obtained with a conventional polymeric support, while the ones above have been obtained using polysaccharide supports post-modified according to the invention.

FIG. 4 is a chromatogram that shows the separation of three proteins with hydrophobic interaction chromatography (HIC) on various matrices. The bottom chromatogram has been obtained with a conventional polymeric support, while the ones above have been obtained using polysaccharide supports post-modified according to the invention. More specifically, the separation medium used for the lowest curve is Phenyl Sepharose™ (Amersham Biosciences AB, Uppsala, Sweden), while the ones below show, from top to bottom: Support postmodified according to the invention with 100% hydroxybutylvinyl ether (HBVE); 80% HBVE and 20% butylvinyl ether (BVE); 60% HBVE and 40% BVE; 40% HBVE and 60% BVE; and finally, at the top, 20% HBVE and 80% BVE. Thus, the ratio of the more hydrophobic monomer increases from the bottom to the top of the picture. The proteins used are myoglobin, ribonuclease, α-chymotrypsin and α-lactalbumin. The principles disclosed in this application were used to prepare such post-modified supports, and the chromatogram were obtained according to well-known chromatographic principles.

EXPERIMENTAL PART

The present examples are included herein for illustrative purposes only and should not be interpreted as limiting the invention as defined by the appended claims. All references included below and elsewhere in the present specification are hereby included by reference.

EXAMPLE 1

Support Post-Modified with by Hydroxybutyl Vinyl Ether 1.0 gr. 2,2'-azo-bis(2,4-dimethylvaleronitrile (V-65) was dissolved in 40.0 mL hydroxybutyl vinyl ether. 6.00 gr. of Sepharose™ 6 Fast Flow with allyl groups accessible for radical polymerisation were soaked in the monomer/initiator solution. The reaction mixture was gently stirred with a mechanical stirrer at 70° C. for 15 hours. After complete reaction excess monomer, oligomers and polymers not covalently coupled to the resin were removed by a washing procedure using methanol and water as solvent. As shown in the NMR spectra (FIG. 1) nearly all of the remaining allyl groups originally observed between 5–6 ppm were consumed and a significant amount of the poly-Hydroxybutyl vinyl ether has been incorporated to the Sepharose™ Fast Flow resin as shown by the resonance's at 1.5 and 3.4 ppm, respectively.

The invention claimed is:

1. A method for post-modification of a porous polymeric polysaccharide support including one of more unreacted double bonds, said method comprising
   (a) contacting the polymeric support with a liquid phase comprising at least one grafting compound;
   (b) initiating a free radical in the mixture obtained from step (a) between one or more double bonds on said polymeric support and one or more reactive groups on the grafting compound, and optionally
   (c) washing the polymeric support to remove any excess of grafting compound;
wherein at least one grafting compound is represented by the general formula (I) below:

wherein
   R=a $C_1$ to $C_{30}$ alkyl chain, optionally substituted with one or more hydroxyl, amine, carbonyl, ether, or oxygen;
   R'=H or $CH_3$;
   R''=a $C_0$ to $C_{30}$ alkyl chain or oxygen; and
   X=$O_n$, wherein n is an integer of 0–1, with the proviso that if R'' is oxygen, then n is 0, and if R'' is an alkyl chain, then n is 1.

2. The method of claim 1, wherein the porous polymeric polysaccharide support is chemically cross-linked.

3. The method of claim 1, wherein the reactive double bonds present on the polysaccharide have been provided by treatment thereof with a functional epoxide.

4. The method of claim 1, wherein the support is comprised of one or more particles.

5. The method of claim 1, wherein step (b) is performed by adding a free radical initiator in an amount sufficient to polymerise added grafting compound to the polymeric support.

6. The method of claim 1, wherein in formula (I), R is a $C_1$–$C_{10}$ alkyl chain, R' is H, R'' is O and n is the integer 0.

7. The method of claim 1, wherein in formula (I), R is a $C_{17}$ alkyl chain.

8. The method of claim 1, wherein in formula (I), R is a $C_1$–$C_{10}$ alkyl chain, R' is H, R'' is $CH_2$ and n is the integer 1.

9. The method of claim 1, wherein at least one grafting compound comprises one or more hydrophilic groups, which method comprises a further step for derivatisation of said hydrophilic group(s).

10. The method of claim 1, wherein at least one grafting compound comprises one or more functional groups in addition to the reactive double bond, which functional group is available as a ligand on the surface of the so modified support.

11. A process for providing a separation medium with a predetermined hydrophobicity comprising the method of post-modification of claim 1, wherein at least two grafting compounds of different hydrophobicity are used.

12. The process of claim 11, wherein a first grafting compound is a hydroxy alkyl vinyl ether and a second grafting compound is a vinyl alkyl ether.

13. The process of claim 11, wherein a first grafting compound is represented by formula (I) and a second grafting compound is a functional monomer of lower or higher hydrophobicity than the first grafting compounds.

* * * * *